April 1, 1958     A. D. McDUFFIE     2,828,730
COMBUSTION CHAMBER FOR INTERNAL COMBUSTION ENGINE
Filed Aug. 13, 1954

INVENTOR
Archie D. McDuffie
BY L. D. Busch
ATTORNEY

United States Patent Office 2,828,730
Patented Apr. 1, 1958

2,828,730

COMBUSTION CHAMBER FOR INTERNAL COMBUSTION ENGINE

Archie D. McDuffie, Berkley, Mich., assignor to General Motors Corporation, Detroit, Mich., a corporation of Delaware Application August 13, 1954, Serial No. 449,684

6 Claims. (Cl. 123—191)

The present invention relates to internal combustion engines and more particularly to the shape of the combustion chamber therefor.

In an internal combustion engine a combustible charge is compressed and burned in a chamber defined by an end of a piston reciprocably disposed in a cylinder and a surface formed on a cylinder head which is positioned to register with the open end of the cylinder. Although the fuel economy of such engines may be improved by raising the compression ratio, there is a limit beyond which this ratio cannot be raised. If this limit is exceeded, pre-ignition and/or detonation may occur.

It is now proposed to provide a combustion chamber adapted to employ a high compression ratio without causing pre-ignition or detonation to occur. The chamber may include a compact firing zone and a space having a large surface-to-volume ratio. This space may be defined by a plane surface on the cylinder head and a parallel plane surface on the end of the piston. By placing the spark plug electrodes in the firing zone the burning of the gases will originate in this zone. As a result, a large majority of the gases will be burned very rapidly in the firing zone having a large volume-to-surface ratio while the final stages of combustion will occur in a space having a large surface-to-volume ratio.

The exhaust valve which normally becomes very hot may be disposed in the firing zone adjacent the spark plug electrodes so that the initial burning will originate adjacent the exhaust valve. Thus the exhaust valve will not be a hot spot in the unburned gases that will tend to detonate them. The intake valve may seat in the plane surface on the head in direct axial alignment with the cylinder. The intake valve stem is preferably disposed on an axis normal to the plane surface and parallel to the axis of the cylinder. When the charge flows through this valve, it will flow directly into the cylinder in an axial direction without having to negotiate any turns. This will present the minimum resistance to the flow of the charge into the cylinder and accordingly, will improve the volumetric efficiency. In addition, the end of the valve is preferably a plane surface which is positioned to be coincident with the plane surface on the head. Thus there will be no discontinuities or pockets formed in the planar space between the head and the piston.

Figure 1:
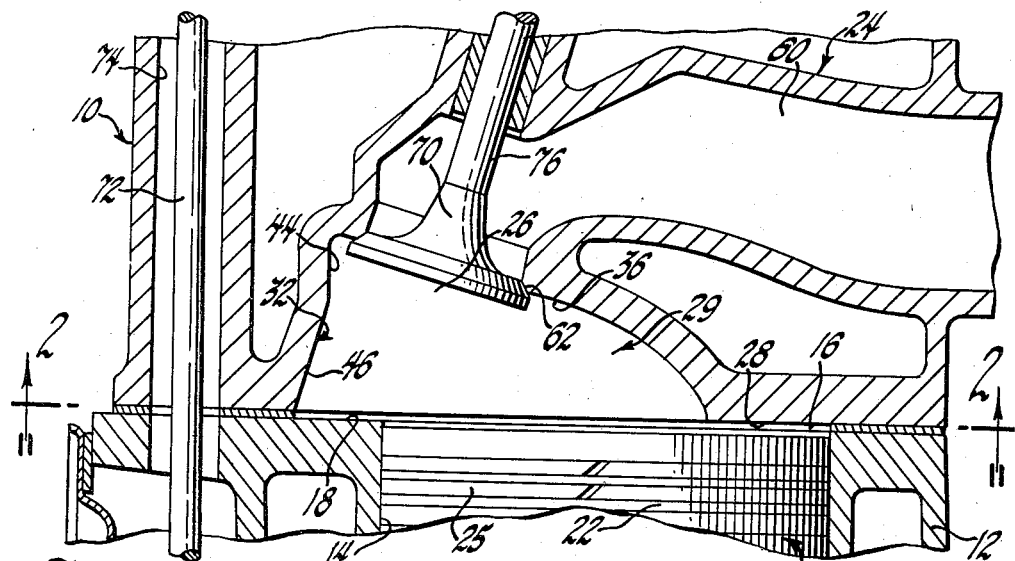
Fig. 1 is a cross sectional view of a portion of an engine employing the present invention and is taken through the cylinder head substantially along the plane of line 1—1 in Fig. 2 and through the cylinder block along a plane including the axis of the cylinder.
Figure 2:
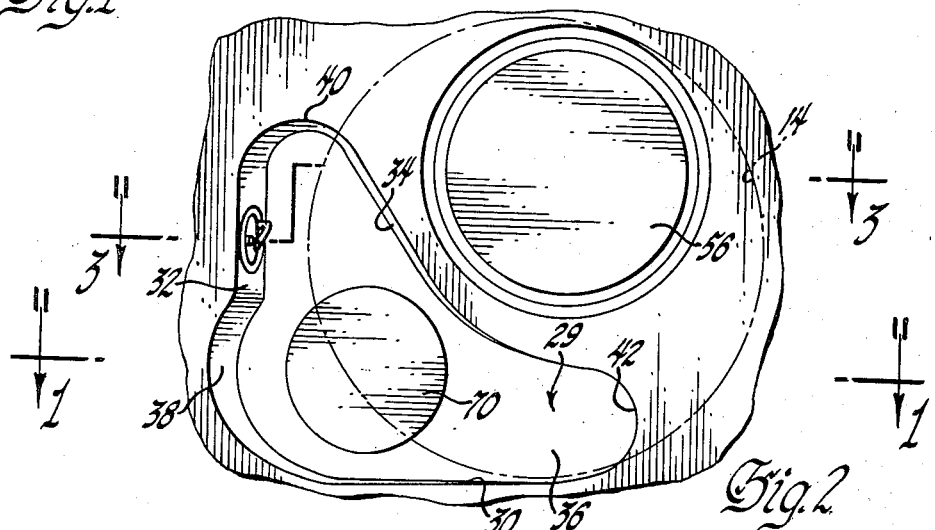
Fig. 2 is a plan view of the cylinder head taken substantially along the plane of line 2—2 in Fig. 1.
Figure 3:
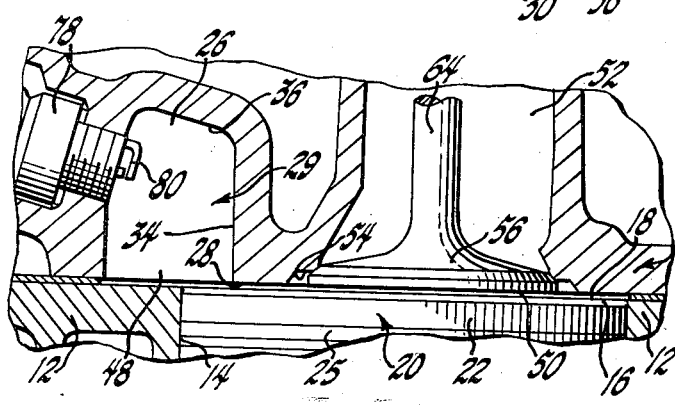
Fig. 3 is a cross sectional view similar to Fig. 1 but taken substantially along the planes indicated by the line 3—3 in Fig. 2.

Referring to the drawings in more detail, the present invention may be embodied in any suitable engine 10 having a cylinder block 12 with one or more cylinders 14 extending therethrough to form openings 16 in the block face 18 which is a planar surface in the top of the block 12. A crankcase may be provided in a space below the block 12 which communicates with the lower ends of the cylinders 14 for rotatably supporting a crankshaft having a plurality of throws thereon.

A piston 20 may be reciprocably disposed in each of the cylinders 14 so as to be connected to one of the throws on the crankshaft. The piston 20 may have a cylindrical skirt 22 disposed in sliding engagement with the cylinder walls 14. The upper end of the skirt may have a plurality of ring receiving grooves formed therein to form a ring belt 25. Piston rings may be placed in these grooves for sliding engagement with the cylinder walls 14 to form a seal which will prevent the flow of gases between the piston 20 and cylinder 14.

A cylinder head 24 may be secured to the top of the cylinder block 12 so that it will register with the openings 16 formed in the head 24 by the upper ends of the cylinders 14. The head 24 may include one or more cavities 26 which have at least a portion thereof positioned to communicate with the open end 16 of the cylinder 14. These cavities 26 together with the plane surface forming the face 28 of the head 24 will close the open end of the cylinder 14 and will cooperate with the upper end of the piston 20 to define a combustion chamber 29.

This cavity 26 is a generally triangular shape and is defined by a plurality of walls 30, 32 and 34 disposed substantially normal to the face 28 on the head 24 and a substantially plane surface 36 angularly disposed with respect to the face 28 of the head. The first wall 30 may be substantially tangential to the cylinder wall 14 while the second wall 32 is substantially normal to the first wall 30. It may be seen that both of these walls 30 and 32 extend into the head 24 from the face 18 of the cylinder block 12. In the present instance neither of these walls cross the open end 16 of the cylinder 14. The third wall 34 may be positioned to extend diagonally between the first and second walls and thereby give the cavity 26 the appearance of a triangle. Although the walls 30, 32 and 34 are substantially planar, the third wall 34 may have an arcuate shape to form a convex surface. The adjacent ends of all three of the walls may be connected with each other by curved portions 38, 40 and 42. The end 38 of the second wall adjacent the first wall may be substantially concentric with a valve seat in the plane surface 36. It should be noted that if desired the second wall 32 may have a band 44 normal to the face 28 of the head and a band 46 slightly angularly disposed with respect to the first band 44.

The plane surface 36 may be angularly disposed with respect to the face 28 of the head so that the portion of the cavity 26 adjacent the intersection of the first and second walls 30 and 32 is the deepest. The plane surface 36 may slope downwardly and away from this apex so the portion adjacent the third wall 34 is the shallowest. This thus forms a somewhat wedge shape with the thinnest portion adjacent the wall 34. It will thus be seen that the length of the third wall 34 is considerably shorter than the total length of the first and second walls 30 and 32.

It may thus be seen that the combustion chamber 29 includes a firing zone 48 and a "quench" or "squish" zone 50. The firing zone 48 is defined by the walls of the cavity and it has a small surface-to-volume ratio. The quench or squish zone 50 is defined by the face 28 of the head and the upper end of the piston 20 and may have a large surface-to-volume ratio. When the piston 20 approaches top dead center the volume of the space between the piston and the face 28, i. e., the squish zone 50 will decrease very rapidly. As a result the gases in this space will be forced to flow into the cavity 26 in the form of a violent blast that will greatly increase the turbulence in the firing zone 48.

In order to introduce a combustible charge into the combustion chamber 29, an induction system may be provided. In the present instance this system includes a carburetor and an intake manifold having a plurality of distribution passages communicating with the carburetor and forming outlets in one side of the manifold. An intake passage 52 may extend through the head 24 with the outer end thereof forming an inlet port in the side of the head which is positioned to register with an outlet in the manifold. The inner end of the intake passage 52 may be normal to the face 28 of the head 24 so as to intersect the face 28 and form an intake valve seat 54. It may be seen that the intake passage 52 will discharge directly into the cylinder substantially parallel to the axis of the cylinder 14. By placing the valve seat 54 in the planar surface, there is enough room available to make it possible to employ a very large intake valve 56 and discharge the incoming gases directly into the cylinder 14. Since the intake valve 56 may be large and the gases do not have to be deflected to flow axially into the cylinder 14 the flow resistance will be reduced to a minimum thus improving the volumetric efficiency.

The intake valve 56 may be disposed in the intake valve seat 54 for controlling the flow of the charge into the combustion chamber 29. It is preferable that the center line of the valve stem 64 project upwardly along an axis substantially parallel to the axis of the cylinder 14. This will permit the face of the valve 56 to be in a plane substantially coincident with the plane surface 28 on the head 24. Thus when the piston 20 reaches top dead center, the "quench" or "squish" zone 50 between the upper end of the piston 20 and the head 24 will be a plane of substantially uniform thickness. The end of the valve 56 will not form any pockets or irregularities which will trap the unburned gases and interfere with the proper burning thereof.

An exhaust valve 70 may be provided to seat in the plane surface 36 in the cavity 26 for controlling the flow of exhaust gases out of the combustion chamber 29. The intake and exhaust valve 56 and 70, respectively, may be actuated by means of a camshaft driven by the engine crankshaft. The push rods 72 may be disposed in a passage 74 so that one end will engage the camshaft and the other end will engage a rocker arm connected to the valve stems 76.

An exhaust system may also be provided for allowing the burned gases present in the combustion chamber 29 escaping into the atmosphere. The system may include an exhaust manifold having exhaust passage forming inlets along one side thereof. The outer end of an exhaust passage 60 in the head 24 may form exhaust ports in the side of the head positioned to register with the inlets in the exhaust manifold. The inner end of the passage 60 intersects the planar surface 36 to form an exhaust valve seat 62.

In order to ignite any combustible charge present in the combustion chamber 29, a spark plug 78 may be provided in the head 24 with the electrodes 80 thereon projecting into the combustion chamber 29. It has been found preferable to place the electrodes 80 in the firing zone 48 so they will project inwardly through the second wall 34 and be disposed in the neighborhood of the exhaust valve 70.

It will thus be seen that when the spark plug 78 is actuated the charge will be ignited in the firing zone 48. Since this zone 48 has a large volume-to-surface ratio the large majority of the charge will be rapidly consumed. After the flame front progresses from the electrodes 80 across the firing zone 48, it will enter the "quench" zone 50. When the piston 20 is at or near top dead center this zone 50 will have a large surface-to-volume ratio. Due to the metallic surfaces on the head 24 and the piston 20, a considerable amount of heat will be absorbed and the temperature for the unburned gases will be maintained below the point at which detonation occurs.

It is to be understood that, although the invention has been described with specific reference to a particular embodiment thereof, it is not to be so limited since changes and alterations therein may be made which are within the full intended scope of this invention as defined by the appended claims.

What is claimed is:

1. A combustion chamber formed by an end of a piston reciprocably disposed in a cylinder and a cylinder head, said cylinder head having a cavity positioned to register with at least a portion of an open end of said cylinder and a planar surface positioned to register with the entire remaining portion of said end, said cavity being defined by a plurality of walls disposed generally normal to said planar surface and a surface angularly disposed with respect to said planar surface, at least two of said walls being disposed adjacent the walls of said cylinder and another of said walls extending diagonally between the opposite ends of said two walls across said open end of said cylinder, an intake valve seat in said planar surface, an exhaust valve seat in said cavity and a spark plug socket communicating with said cavity for positioning a set of spark plug electrodes adjacent said exhaust valve.

2. The combustion chamber of claim 1 wherein said intake valve seat is disposed parallel to said planar surface and an intake valve is disposed in said seat and has a stem positioned orthogonal to said planar surface.

3. A combustion chamber formed by a piston reciprocably disposed in a cylinder head, said cylinder head having a planar surface and a cavity, at least a portion of said cavity being positioned to register with an open end of said cylinder, said planar surface being positioned to register with the remaining portion of said head, said cavity being defined by a plurality of walls disposed generally normal to said planar surface and an inclined surface obliquely disposed with respect to said planar surface, at least two of said walls being disposed adjacent the walls of said cylinder and another of said walls extending diagonally between the opposite ends of said two walls across said open end of said cylinder an intake valve seat in said planar surface, an exhaust valve seat in said cavity and a spark plug socket extending through one of said two walls for communicating with said cavity and positioning a set of electrodes adjacent said exhaust valve, said last mentioned wall having a band positioned substantially normal to said planar surface and a band substantially orthogonal to said inclined surface.

4. A cylinder head adapted to be secured to a cylinder block having a cylinder therethrough for receiving a reciprocating piston, said cylinder head comprising a planar surface positioned to extend across at least a portion of an open end of said cylinder and a cavity having a section thereof positioned to register with the remaining portion of said open end, said cavity including an inclined surface disposed oblique to said planar surface and a plurality of walls disposed generally normal to said planar surface, at least two of said walls being disposed to be positioned substantially tangent to said cylinder and another of said walls being positioned to extend diagonally between the opposite ends of said two walls to form a generally triangular shape, an intake valve seat in said planar surface disposed parallel to said planar surface, an exhaust valve seat in said inclined surface of said cavity and a spark plug socket extending through one of said walls for positioning electrodes in said cavity adjacent said exhaust valve seat.

5. A cylinder head adapted to be secured to a cylinder block having a cylinder therethrough for receiving a reciprocating piston, said cylinder head comprising a planar surface positioned to extend across at least a portion of an open end of said cylinder and a cavity having a section thereof positioned to register with the remaining portion of said open end, said cavity including an inclined surface disposed oblique to said planar surface and a plurality of walls disposed generally normal to said planar surface, at least two of said walls being disposed to be positioned substantially tangent to said cylinder and another of said walls being positioned to extend diagonally between the opposite ends of said two walls to form a generally triangular shape, an intake valve seat in said planar surface disposed parallel to said planar surface, an exhaust valve seat in said inclined wall of said cavity and a spark plug socket in said head extending through one of said first walls, said wall including a band substantially normal to said planar surface and a band substantially normal to said inclined surface.

6. The cylinder head of claim 5 wherein an intake passage extends through said head to communicate with said intake valve seat, the end of said passage adjacent said intake valve seat being substantially normal to said planar surface.

References Cited in the file of this patent

UNITED STATES PATENTS

| | | |
|---|---|---|
| 2,094,893 | Jacoby | Oct. 5, 1937 |
| 2,133,592 | Taub | Oct. 18, 1938 |
| 2,757,655 | Nallinger | Aug. 7, 1956 |